(12) United States Patent
Sip

(10) Patent No.: US 8,090,889 B2
(45) Date of Patent: Jan. 3, 2012

(54) MOTHER BOARD, SYSTEM AND METHOD FOR CONTROLLING THE WORK OF THE MOTHER BOARD

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hong Hai Precision Industry Co., Ltd., Tu-Cheng, New Taipei (TW)

( * ) Notice: Subject to any disclaimer, the term of this patent is extended or adjusted under 35 U.S.C. 154(b) by 322 days.

(21) Appl. No.: 12/490,276

(22) Filed: Jun. 23, 2009

(65) Prior Publication Data

US 2010/0217908 A1 Aug. 26, 2010

(30) Foreign Application Priority Data

Feb. 23, 2009 (CN) .......................... 2009 1 0300510

(51) Int. Cl.
*G06F 13/00* (2006.01)
(52) U.S. Cl. ........................................ 710/300; 718/100
(58) Field of Classification Search .................. 710/300, 710/100, 301–306; 718/102, 104, 100
See application file for complete search history.

(56) References Cited

U.S. PATENT DOCUMENTS

| 7,457,725 | B1 * | 11/2008 | Civilini ......................... 702/183 |
| 2008/0229318 | A1 * | 9/2008 | Franke ........................... 718/104 |
| 2009/0007120 | A1 * | 1/2009 | Fenger et al. .................. 718/102 |
| 2009/0089782 | A1 * | 4/2009 | Johnson et al. ............... 718/100 |

\* cited by examiner

*Primary Examiner* — Brian Misiura
*Assistant Examiner* — Kim Huynh
(74) *Attorney, Agent, or Firm* — Altis Law Group, Inc.

(57) ABSTRACT

A mother board is disclosed. The mother board includes a first processor and a controlling module. A second processor is electrically coupled to the mother board. The controlling module includes a utilization ratio comparing unit and a controlling unit. The utilization ratio comparing unit is configured for comparing a current utilization ratio of the first processor with a predetermined first utilization ratio, and comparing a current utilization ratio of the second processor with a predetermined second utilization ratio. The controlling unit is configured for controlling the first processor and the second processor to process data together when the current utilization ratio of the first processor is lower than the predetermined first utilization ratio and the current utilization ratio of the second processor is higher than the predetermined second utilization ratio.

13 Claims, 3 Drawing Sheets

MOTHER BOARD, SYSTEM AND METHOD FOR CONTROLLING THE WORK OF THE MOTHER BOARD

BACKGROUND

1. Technical Field

The present disclosure relates to computers, and, particularly, to a mother board, a system and a method for controlling the work of the mother board.

2. Description of Related Art

Most modern computer mother board includes graphic accelerator and sound card to reduce overall system cost. Because these built-in functionalities are usually not high end hardware and video and graphic performance is the dominating factor to attract end users in applications like set-top box (e.g. TV), game machine, video editing, IP TV and video phone etc., external video/graphic processor is required. However, when the computer is installed with an external video/graphic processor and a built-in video/graphic processor at the same time, the built-in video/graphic processor is usually idled. As cost is always a major factor in consumer product design, it is not wise to have a built-in graphic processor on the mother board when consumers will inevitable buy another external graphic processor. In addition, the external video/graphic processor may even have to be replaced as the user needs changes.

Therefore, it is desirable to provide a mother board, a system and method for controlling the work of the mother board which can overcome or at least alleviate the above-mentioned problems.

BRIEF DESCRIPTION OF THE DRAWINGS

Many aspects of the present mother board, system and method for controlling the work of the mother board should be better understood with reference to the following drawings. The components in the drawings are not necessarily drawn to scale, the emphasis instead being placed upon clearly illustrating the principles of the present mother board, system and method for controlling the work of the mother board. Moreover, in the drawings, like reference numerals designate corresponding parts throughout the several views.

DETAILED DESCRIPTION

Embodiments of the present mother board, system and method for controlling the work of the mother board will be now described in detail with reference to the drawings.

Figure 1:
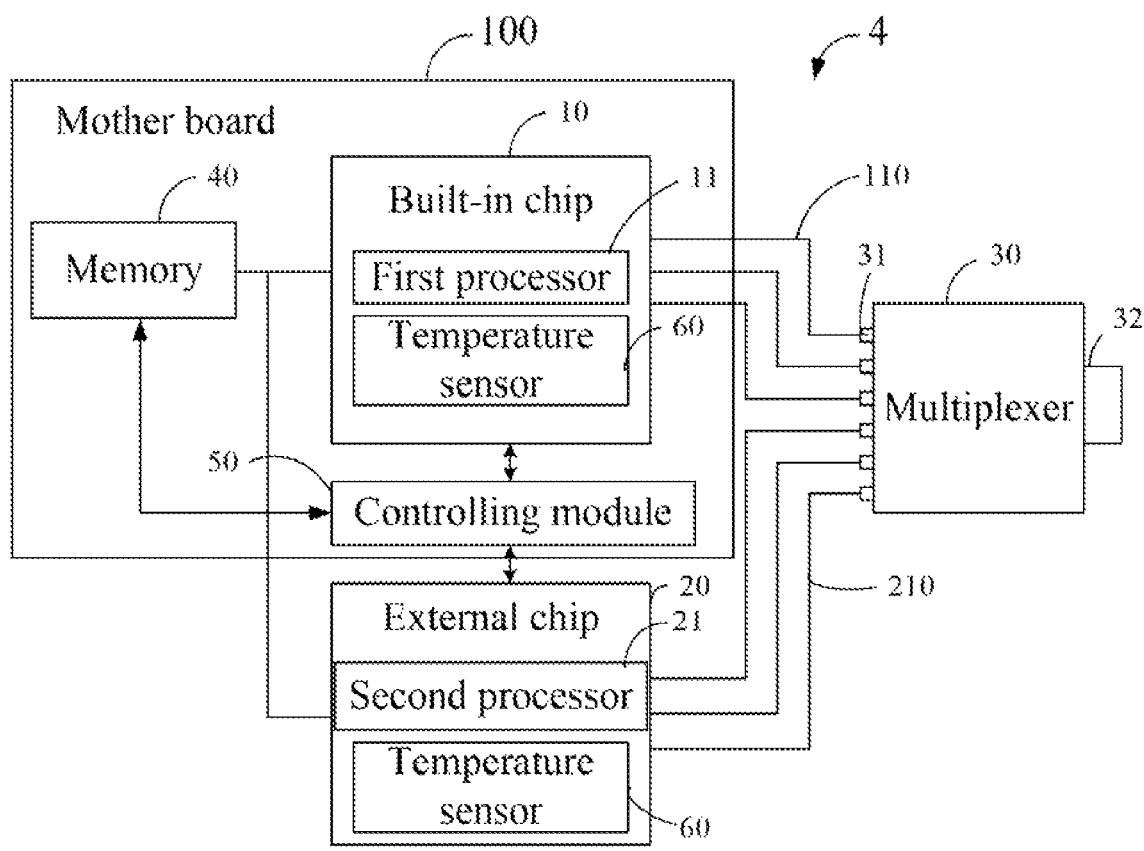
FIG. 1 is a functional block diagram of a mother board including a controlling module, according to an exemplary embodiment.

Referring to FIG. 1, a system 4 of an electronic device (e.g. computer, not shown) for controlling work of a mother board 100 integrated in the electronic device, according to an exemplary embodiment, is illustrated. The mother board 100 includes a built-in chip 10 with a first processor 11. The system 4 includes the mother board 100 and an external chip 20 with a second processor 21 and a multiplexer 30 electrically coupled to the mother board 100. In this embodiment, the first processor 11 is embedded in the built-in chip 10 and the second processor 21 is embedded in the external chip 20. The system 4 further includes a memory 40 and a controlling module 50.

The built-in chip 10 and the external chip 20 can be a graphics card, a sound card or a central processing unit (CPU). In this embodiment, the built-in chip 10 is a graphics card integrated in the mother board 100, and the external chip 20 is an external graphics card. The first processor 11 and the second processor 21 have a same function. When the external chip 20 is coupled to the mother board 100, the second processor 21 is used more than the first processor 11. The second processor 21 takes precedence of processing a data.

The multiplexer 30 is electrically coupled to the built-in chip 10 and the external chip 20 and configured for transmitting the processed data from the first processor 11 and the second processor 21 to a peripheral device (e.g. display, not shown). The built-in chip 10 is electronically coupled to the multiplexer 30 via a number of first transmission lines 110. The external chip 20 is electronically coupled to the multiplexer 30 via a number of second transmission lines 210. The multiplexer 30 includes a number of input terminals 31 and at least one output terminal 32. The input terminals 31 are configured for connecting the first transmission lines 110 and the second transmission lines 210 to the multiplexer 30. The output terminal 32 is configured for outputting data from the first processor 11 and the second processor 21 to the peripheral device.

The memory 40 stores data to be processed or processed data from the first processor 11 and the second processor 21. That is, the memory 40 is shared by the first processor 11 and the second processor 21.

The controlling module 50 controls the first processor 11 and the second processor 21 to process data to be processed and transmit processed data to the peripheral device via the multiplexer 30 correspondingly.

Figure 2:
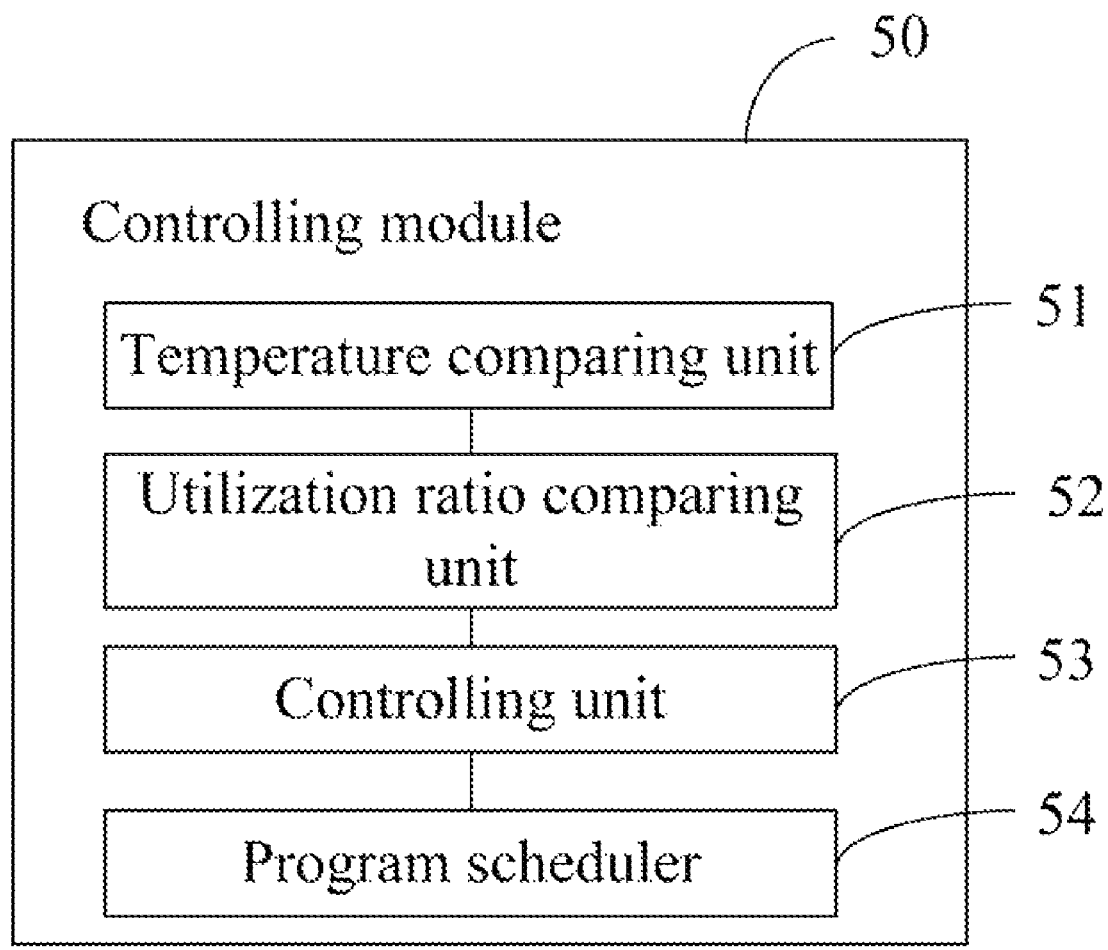
FIG. 2 is a functional block diagram of the controlling module of the mother board of FIG. 1.

Referring to FIG. 2, the controlling module 50 includes a utilization ratio comparing unit 52 and a controlling unit 53.

The utilization ratio comparing unit 52 predetermines a first utilization ratio for the first processor 11 and a second utilization ratio for the second processor 21. The utilization ratio comparing unit 52 compares a current utilization ratio of the first processor 11 with the predetermined first utilization ratio, and compares a current utilization ratio of the second processor 21 with the predetermined second utilization ratio to determine whether the first and second processors 11, 21 to work together or not. In this embodiment, by default, the utilization ratio comparing unit 52 compares the current utilization ratio of the second processor 21 with the second utilization ratio first.

The controlling unit 53 selectively chooses a combination of the first processor 11 and the second processor 21 to process data according to the comparing results of the utilization ratio comparing unit 52.

Because the second processor 21 processes data by default, when the current utilization ratio of the first processor 11 is lower than the predetermined first utilization ratio, and the current utilization ratio of the second processor 21 is also lower than the predetermined second utilization ratio, the controlling unit 53 selectively chooses the second processor 21 to process data and signals the first processor 11 to be in a wait state.

When the current utilization ratio of the first processor 11 is higher than the predetermined first utilization ratio, and the current utilization ratio of the second processor 21 is also higher than the predetermined second utilization ratio, the first processor 11 and the second processor 21 both are not optional. Therefore, the controlling unit 53 controls the first processor 11 and the second processor 21 to stop working.

When the current utilization ratio of the first processor 11 is lower than the predetermined first utilization ratio, and the current utilization ratio of the second processor 21 is higher than the predetermined second utilization ratio, the controlling unit 53 controls the first processor 11 and the second processor 21 to process the data to be processed together until the current utilization ratio of the second processor 21 is lower than the predetermined second utilization ratio.

When the current utilization ratio of the second processor 21 is lower than the predetermined second utilization ratio, and the current utilization ratio of the first processor 11 is higher than the predetermined first utilization ratio, the controlling unit 53 still controls the second processor 21 to process the data to be processed.

In summary, when the current utilization ratio of the second processor 21 is higher than the predetermined second utilization ratio, data is sharable between the first processor 11 and the second processor 21. When the current utilization ratio of the second processor 21 is lower than the predetermined second utilization ratio, the second processor 21 continues processing data.

In this embodiment, the controlling module 50 further includes a program scheduler 54 configured for transmitting the processed data to the multiplexer 30 in a predetermined sequence.

In this embodiment, each of the built-in chip 10 and the external chip 20 further includes a temperature sensor 60 for sensing the current temperature of the built-in chip 10 and the current temperature of the external chip 20. The temperature sensor 60 is a temperature diode.

Corresponding to the temperature sensor 60 (shown in FIG. 1), the controlling module 50 further includes a temperature comparing unit 51. A first temperature reference of the built-in chip 11 and a second temperature reference of the external chip 20 are predetermined in the temperature comparing unit 51. The temperature comparing unit 51 compares the current temperature of the built-in chip 10 with the first temperature reference and compares the current temperature of the external chip 20 with the second temperature reference to make sure the built-in chip 10 and the external chip 20 do not overheat and determine whether the utilization ratio comparing unit 52 to be operational. In this embodiment, the temperature comparing unit 51 takes precedence of comparing the current temperature of the external chip 20 with the second temperature reference by default.

When the current temperature of the built-in chip 10 is lower than the first temperature reference and the current temperature of the external chip 20 is also lower than the second temperature reference, it indicates that the built-in chip 10 and the external chip 20 are both with the well performing status. Meanwhile, the controlling module 50 reads the current utilization ratio of the second processor 21, and the utilization ratio comparing unit 52 compares the current utilization ratio of the second processor 21 with the predetermined second utilization ratio to make sure the second processor 21 can keep processing the data. The utilization ratio comparing unit 52 also compares the current utilization ratio of the first processor 11 with the predetermined first utilization ratio to make sure the first processor 11 can process the data.

When the current temperature of the built-in chip 10 is higher than the first temperature reference and the current temperature of the external chip 20 is also higher than the second temperature reference, it indicates that the built-in chip 10 and the external chip 20 are both outside of the well performing status. In order to avoid damaging the built-in chip 10 and the external chip 20, the first processor 11 and the second processor 21 are shut down. The utilization ratio comparing unit 52 is also required to stop working to save power.

When the current temperature of the built-in chip 10 is higher than the first temperature reference, but the current temperature of the external chip 20 is lower than the second temperature reference, the utilization ratio comparing unit 52 just compares the current utilization ratio of the second processor 21 with the second utilization ratio to make sure the second processor 21 can process the data and does not compare the current utilization ratio of the first processor 11 with the predetermined first utilization ratio. Because the current temperature of the built-in chip 10 is higher than the first temperature reference, no matter the current utilization ratio of the second processor 21 is higher or lower than the predetermined second utilization ratio, the first processor 11 cannot process the data together with the second processor 21. If the current utilization ratio of the second processor 21 is lower than the second utilization ratio, the second processor 21 keeps processing the data to be processed. If the current utilization ratio of the second processor 21 is higher than the second utilization ratio, the second processor 21 stops working. In addition, the utilization ratio comparing unit 52 will compare the current utilization ratio of the first processor 11 with the predetermined first utilization ratio until the current temperature of the built-in chip 10 is lower than the first temperature reference to make sure the first processor 11 can work.

When the current temperature of the built-in chip 10 is lower than the first temperature reference, but the current temperature of the external chip 20 is higher than the second temperature reference, the utilization ratio comparing unit 52 compares the current utilization ratio of the first processor 11 with the predetermined first utilization ratio to make sure the first processor 11 can share the data from the second processor 21. If the current utilization ratio of the first processor 11 is lower than the predetermined first utilization ratio, the first processor 11 obtains the data to be processed from the second processor 21 to process. If the current utilization ratio of the first processor 11 is higher than the predetermined first utilization ratio, the second processor 21 stops working, the first processor 11 keeps processing the original data but does not obtain a new data to be processed. In addition, the utilization ratio comparing unit 52 compares the current utilization ratio of the second processor 21 with the predetermined second utilization ratio until the current temperature of the external chip 20 is lower than the second temperature reference to make sure the second processor 21 can work.

In use, the temperature comparing unit 51 is in normal opened state and compares the current temperatures with the temperature references (i.e. the first temperature reference and the second temperature reference). The utilization ratio comparing unit 52 compares the current utilization ratio of the second processor 21 with the predetermined second utilization ratio and compares the current utilization ratio of the first processor 11 with the predetermined first utilization ratio according to comparing result of the temperature comparing unit 51. The controlling unit 53 controls the first processor 11 and the second processor 21 to process the data to be processed together and transmit the processed data to the peripheral device via the multiplexer 30 in sequence, if the current utilization ratio of the second processor 21 is higher than the predetermined second utilization ratio, and the current utilization ratio of the first processor 11 and the current temperature of the built-in chip 10 are both lower than the predetermined first utilization ratio and the first temperature reference, respectively. Thus, the mother board 100 can effectively utilize the function of the built-in chip 10 and reduces the burden of the external chip 20.

Figure 3:
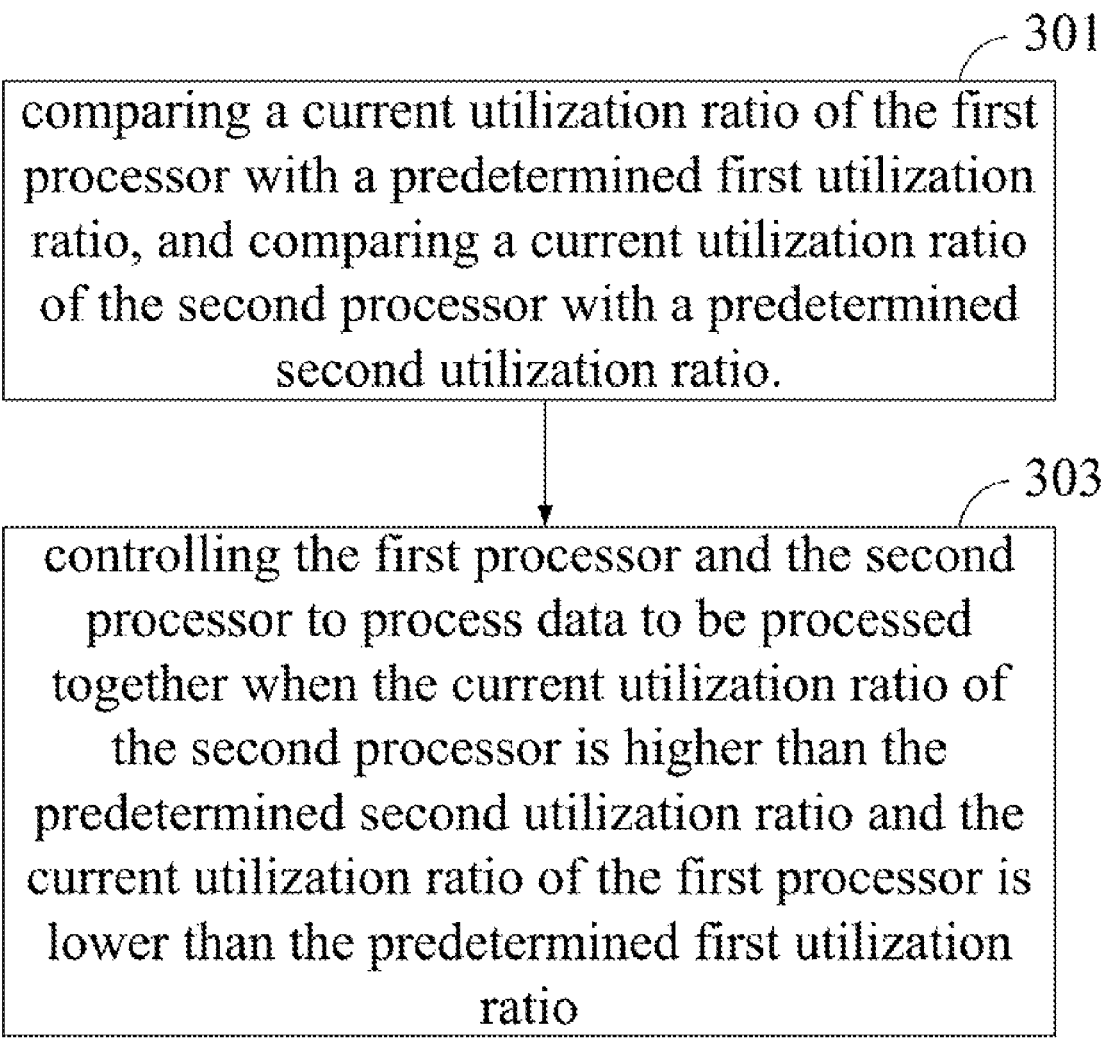
FIG. 3 is a flow chart of a method for controlling the mother board of FIG. 1.

Referring to FIG. 3, a method for controlling the work of the mother board 100 used in the system 4, includes the following steps:

Step 301, comparing a current utilization ratio of the first processor 11 with a predetermined first utilization ratio, and comparing a current utilization ratio of the second processor 21 with a predetermined second utilization ratio.

Step 303, controlling the first processor 11 and the second processor 21 to process data to be processed together when the current utilization ratio of the second processor 21 is higher than the predetermined second utilization ratio and the current utilization ratio of the first processor 11 is lower than the predetermined first utilization ratio.

It should be mentioned that the application of the mother board 100 is not limited to this embodiment. For example, in other alternative embodiments, the mother board 100 also can be used in mobile phone/mp3/mp4 or camera.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A mother board comprising a built-in chip integrated in the mother board, a first processor embedded in the built-in chip, and a controlling module, the controlling module being electrically coupled to an external chip having a second processor therein, the controlling module comprising:
   a temperature comparing unit configured for comparing a current temperature of the built-in chip with a first temperature reference, and comparing a current temperature of the external chip with a second temperature reference to generate a comparing result;
   a utilization ratio comparing unit configured for comparing a current utilization ratio of the first processor with a predetermined first utilization ratio, and comparing a current utilization ratio of the second processor with a predetermined second utilization ratio based on the comparing result; and
   a controlling unit capable of controlling the first processor and the second processor to process data together when the current temperature of the built-in chip is lower than the first temperature reference, the current utilization ratio of the second processor is higher than the predetermined second utilization ratio, and the current utilization ratio of the first processor is lower than the predetermined first utilization ratio.

2. The mother board as claimed in claim 1, further comprising a memory configured for storing the data to be processed and processed data from the first processor and the second processor.

3. The mother board as claimed in claim 2, further comprising a multiplexer electrically coupled to the built-in chip and the external chip and configured for transmitting the processed data from the memory to a peripheral device.

4. The mother board as claimed in claim 3, wherein the multiplexer comprises a plurality of input terminals for electrically connected to the built-in chip and the external chip respectively and at least one output terminal for outputting the data processed by the first processor and the second processor to the peripheral device.

5. The mother board as claimed in claim 3, wherein the controlling module further comprises a program scheduler configured for administering the processed data to the multiplexer in a predetermined sequence.

6. The mother board as claimed in claim 1, wherein each of the built-in chip and the external chip further comprises a temperature sensor configured for sensing the current temperatures of the built-in chip and that of the external chip.

7. The mother board as claimed in claim 6, wherein the temperature sensor is a temperature diode.

8. The mother board as claimed in claim 1, wherein when the current temperature of the built-in chip is lower than the first temperature reference, and the current temperature of the external chip is also lower than the second temperature reference, the utilization ratio comparing unit compares the current utilization ratio of the second processor with the predetermined second utilization ratio to make sure the second processor is capable of keeping processing the data, and compares the current utilization ratio of the first processor with the predetermined first utilization ratio to make sure the first processor can process the data.

9. The mother board as claimed in claim 1, wherein when the current temperature of the built-in chip is higher than the first temperature reference, and the current temperature of the external chip is also higher than the second temperature reference, the first processor and the second processor are shut down and the utilization ratio comparing unit stops working.

10. The mother board as claimed in claim 1, wherein when the current temperature of the built-in chip is higher than the first temperature reference, but the current temperature of the external chip is lower than the second temperature reference, the utilization ratio comparing unit compares the current utilization ratio of the second processor with the predetermined second utilization ratio to make sure the second processor can process the data.

11. The mother board as claimed in claim 1, wherein when the current temperature of the built-in chip is lower than the first temperature reference, but the current temperature of the external chip is higher than the second temperature reference, the utilization ratio comparing unit compares the current utilization ratio of the first processor with the predetermined first utilization ratio to determine that the first processor can share the data from the second processor.

12. A system for controlling the work of a mother board comprising:
   a built-in chip integrated in a mother board;
   a first processor embedded in the built-in chip;
   a controlling module;
   an external chip electrically coupled to the controlling module; and
   a second processor embedded in the external chip;
   the controlling module comprising:
      a temperature comparing unit configured for comparing a current temperature of the built-in chip with a first temperature reference, and comparing a current temperature of the external chip with a second temperature reference to generate a comparing result;
      a utilization ratio comparing unit with a predetermined first utilization ratio corresponding to the first processor and a predetermined second utilization ratio corresponding to the second processor predetermined therein and configured for comparing a current utilization ratio of the first processor with the predetermined first utilization ratio, and comparing a current utilization ratio of the second processor with the predetermined second utilization ratio to determine whether the first and second processors need to work together or not based on the comparing result; and a controlling unit capable of controlling the first processor and the second processor to process data together when the current temperature of the built-in chip is lower than the first temperature reference, the current utilization ratio of the second processor is higher than the predetermined second utilization ratio, and the current utilization ratio of the first processor is lower than the predetermined first utilization ratio.

13. A method for controlling a mother board, the mother board comprising a built-in chip integrated in the mother board and a first processor embedded in the built-in chip, the mother board being coupled to an external chip having a second processor therein, the method comprising:

comparing a current temperature of the built-in chip with a first temperature reference, and comparing a current temperature of the external chip with a second temperature reference to generate a comparing result;

comparing a current utilization ratio of the first processor with a predetermined first utilization ratio, and comparing a current utilization ratio of the second processor with a predetermined second utilization ratio based on the comparing result; and controlling the first processor and the second processor to process data to be processed together when the current temperature of the built-in chip is lower than the first temperature reference, the current utilization ratio of the second processor is higher than the predetermined second utilization ratio, and the current utilization ratio of the first processor is lower than the predetermined first utilization ratio.

* * * * *